(12) United States Patent
Ousley (10) Patent No.: US 7,884,283 B1
(45) Date of Patent: Feb. 8, 2011

(54) SECURITY COVER FOR A UTILITY POLE AND ENCLOSURE AND METHOD

(75) Inventor: Richard L. Ousley, Las Vegas, NV (US)

(73) Assignee: Lighting Security Products, LLC, Ely, NV (US)

( * ) Notice: Subject to any disclaimer, the term of this patent is extended or adjusted under 35 U.S.C. 154(b) by 861 days.

(21) Appl. No.: 11/888,102

(22) Filed: Jul. 31, 2007

(51) Int. Cl.
*H02G 7/20* (2006.01)

(52) U.S. Cl. .................. 174/45 R; 174/46; 174/40 CC; 174/40 R; 411/402; 52/101; 362/431

(58) Field of Classification Search ............... 174/45 R, 174/46, 45 TD, 40 R, 40 CC; 220/251, 284; 81/125; 411/402; 52/87, 101; 191/32; 362/431; 70/56, 57
See application file for complete search history.

(56) References Cited

U.S. PATENT DOCUMENTS

| | | | |
|---|---|---|---|
| 291,771 A | 1/1884 | Rasgorshek | |
| 4,914,258 A | 4/1990 | Jackson | |
| 5,328,291 A | 7/1994 | Wisniewski | |
| 5,641,939 A * | 6/1997 | Tourigny | .................. 174/45 R |
| 6,089,396 A | 7/2000 | Pozek | |
| 6,204,446 B1 * | 3/2001 | Parduhn | ................... 174/45 R |
| 6,303,863 B1 | 10/2001 | Raasch | |
| 6,488,440 B1 | 12/2002 | Hill | |
| 7,059,096 B2 * | 6/2006 | Kuebler et al. | ................ 52/838 |
| 7,560,642 B2 * | 7/2009 | Ygnelzi et al. | ............ 174/45 R |

* cited by examiner

*Primary Examiner*—Dhiru R Patel
(74) *Attorney, Agent, or Firm*—Dan Brown Law Office; Daniel R. Brown (57) ABSTRACT

A security cover for selectively securing an access opening in an enclosure or a utility pole using a padlock with a shackle. The security cover includes a rigid cover, that substantially covers the access opening and has a lock-bar opening formed therethrough. A shroud is fixed about the lock-bar opening on the exterior surface of the rigid cover, and the shroud has an access port for enabling insertion of the padlock between the shroud and the exterior surface of the rigid cover. A lock-bar extends through the lock-bar opening in the rigid cover while the clamp-bar is engaged with the interior of the enclosure. The shackle-hole is accessible through the access port of the shroud.

16 Claims, 9 Drawing Sheets

SECURITY COVER FOR A UTILITY POLE AND ENCLOSURE AND METHOD

BACKGROUND OF THE INVENTION

1. Field of the Invention

The present invention relates to security covers for enclosures. More specifically, the present invention relates to security covers used to protect the electrical wiring in utility poles and electrical junction boxes.

2. Description of the Related Art

Utility poles are in use throughout the world for area lighting, street lighting, sports complex lighting, security cameras, traffic control and monitoring applications, overhead wiring support, wind turbines, radio antenna support, weather instruments, and many other applications. Utility poles are frequently used as a conduit for electrical wiring and cables from ground level to overhead fixtures or various sorts. Electrical junction boxes and electrical conduits are commonly used in combination with utility poles, to facilitate the routing and distribution of electrical power and signaling circuits. Since such wiring and cables must be installed and maintained from time to time, utility poles and electrical junction boxes frequently include access openings, hand-holes, man-holes and corresponding covers.

In the past, simple covers with conventional fasteners, such as screws and bolts, have been employed to close the access openings during normal use. Technicians and service personal would simply remove the covers using conventional tools when installation or service operations were required. A serious problem has arisen in recent years. Due to increasing value of scrape metals, copper in particular, and the unrestrained desire by certain segments of society to acquire cash from the sales of scrap metals, there has been a explosion in the frequency of theft of copper wiring from utility poles and related junction boxes and conduits. This occurs both during the construction phase and operational phase of a system's life. The modus of operandi of such thieves has been to remove one or more access opening covers from utility poles or related junction boxes, and then pull the wiring out of the utility pole, conduits and junction boxes. Of course, such action is ungraceful and frequently causes damage to the wiring, fixtures, and even the poles and junction boxes themselves. In fact, there have been occurrences where wiring has been stolen several times from the same utility pole installation. Thus, it can be appreciated that there is a need in the art for an apparatus, system and method for selectively securing access openings in utility poles and related electrical junctions boxes.

SUMMARY OF THE INVENTION

The present invention teaches a security cover to selectively secure an access opening in an enclosure using a padlock with a shackle. The security cover includes a rigid cover, that substantially covers the access opening in the enclosure, and has a lock-bar opening formed therethrough. A shroud is fixed about the lock-bar opening on the exterior surface of the rigid cover, and the shroud has an access port for enabling insertion of the padlock between the shroud and the exterior surface of the rigid cover. An alignment flange extends from the interior surface of the rigid cover, which engages the access opening and aligns the rigid cover therewith. The security cover also includes a clamp-bar that has a dimension sufficient to engage an interior surface of the enclosure, and a lock-bar connected to the clamp-bar at a first end. The lock-bar has a shackle hole formed in a second end. The lock-bar extends through the lock-bar opening in the rigid cover while the clamp-bar is engaged with the interior of the enclosure. The shackle-hole is accessible through the access port of the shroud.

In a specific embodiment of the security cover, where the enclosure is an electrical enclosure, the security cover is adapted to prevent the theft of copper wiring disposed within the enclosure. In another specific embodiment, the access opening is a hand-hole having a frame fixed to the enclosure, and the clamp-bar engages the hand-hole frame in the interior of the enclosure. In another specific embodiment, the shroud has three sides and an exterior front surface, and the access port is formed through omission of a fourth side of the shroud. In another embodiment, the cover, the alignment flange, and the shroud are welded to form an integral unit. In another specific embodiment, the clamp-bar and the lock-bar are welded to form an integral unit. In another specific embodiment, wherein the lock-bar is threaded along its second end, a retaining nut is threadably engaged to the second end between the exterior surface of the rigid cover and the shackle hole.

The present invention also teaches an electrical wiring security cover for a hand-hole in a utility pole, which is selectively securable using a padlock with a shackle. The security cover includes a rigid cover, that substantially covers the hand-hole in the utility pole, and that has a lock-bar opening formed therethrough. A shroud is fixed about the lock-bar opening on the exterior surface of the rigid cover, and the shroud has an access port for enabling insertion of the padlock between the shroud and the exterior surface of the rigid cover. An alignment flange extends from the interior surface of the rigid cover for engaging the hand-hole opening and aligning the rigid cover therewith. The security cover also includes a clamp-bar with dimensions sufficient to engage an interior surface within the utility pole. A lock-bar is connected to the clamp-bar at a first end, and has a shackle hole formed in a second end. The lock bar extends through the lock-bar opening in the rigid cover while the clamp-bar is engaged with the interior of the utility pole. The shackle-hole is accessible through the access port in the shroud.

In a specific embodiment of the foregoing security cover, where the hand-hole is in a transformer base attached to the utility pole, the rigid cover is aligned with the hand-hole in the transformer base of the utility pole.

The present invention also teaches a security cover for an access opening in an enclosure, which is selectively securable using a padlock with a shackle. The security cover includes a frame with an opening conformed to the shape of the access opening in the enclosure, which has a lock-bar fixed thereto that extends beyond an exterior side thereof. The lock-bar has a shackle-hole. The security cover includes a rigid cover that covers the opening in the frame, and that has a lock-bar opening formed therethrough. The lock-bar extends through the lock-bar opening while the rigid cover is engaged with the frame, which enables retention of the rigid cover on the exterior side of the frame by engaging the padlock shackle through the shackle hole. A lock shroud is fixed to the exterior surface of the rigid cover about the lock-bar opening. The padlock shroud has an access port for insertion of the padlock. The security cover also includes plural engaging members flexibly coupled to the frame that extend beyond the interior side of the frame. The engaging members are adapted to extend into the interior of the enclosure when the frame is aligned to the access opening of the enclosure. There are also plural urging means correspondingly disposed between the frame and the plural engaging members. The plural urging means are adapted to urge the plural engaging members against interior surfaces of the enclosure, which thereby fixedly retain the frame to the access opening of the enclosure.

In a specific embodiment of the foregoing securing cover, where the enclosure is a ground-installed electrical enclosure, the security cover is adapted to prevent the theft of copper wiring disposed within the enclosure. In another specific embodiment, the frame further includes at least a first opening formed therein, and the cover further includes at least a first cover tang that extends from its exterior side, which engages the first opening in the frame, and thereby retains the cover to the frame. In another specific embodiment, the lock shroud includes three sides and an exterior front surface, and the access port is formed by omitting a fourth side of the shroud. In another specific embodiment, the securing cover further includes plural hinges disposed between the frame and the plural engaging members to provide the flexibly coupling of the engaging members to the frame. In another specific embodiment, the plural urging means are threaded fasteners disposed to rotate the plural engaging means outwardly, which thereby engage the interior of the enclosure and retains the frame in position. In another specific embodiment, wherein the enclosure includes its own exterior cover, the rigid cover further includes at least a first fastening means disposed thereon for access from the exterior surface thereof, for engaging at least a first fastener for retaining the exterior cover about the exterior surface of the rigid cover.

The present invention teaches a method of selectively securing, against theft, the electrical wiring in a utility pole that has a hand-hole designed for use with a conventional hand-hole cover. The method includes the steps of inserting a clamp-bar and lock-bar unit into the hand-hole and aligning the clamp-bar portion to engage an interior surface of the utility pole such that an end of the lock-bar having a shackle hole formed therein is exposed on the exterior of the hand-hole, and, substantially covering the hand-hole with a rigid cover, and aligning at least a first flange extending from the interior surface of the rigid cover with the hand-hole. And, the steps of engaging a lock-bar opening formed in the rigid cover about the lock-bar such that the shackle-hole of the lock-bar is presented within a shroud, that has an excess port, on the exterior surface of the rigid cover, and, inserting a padlock into the access port of the shroud and engaging the padlock shackle with the shackle hole in the lock-bar, and also, locking the padlock, thereby securing access to the electrical wiring against theft.

The present invention teaches a method of selectively securing, against theft, the electrical wiring in an electrical enclosure that has an access opening designed for use with a conventional cover. The method includes the steps of aligning a frame to the access opening in the electrical enclosure, where the frame has a lock-bar with a shackle hole extending from its exterior side and plural engaging members flexibly coupled thereto and extending beyond its interior side, and, operating plural urging means correspondingly disposed between the frame and the plural engaging members, thereby urging the plural engaging members against interior surfaces of the enclosure, and thereby fixedly retaining the frame to the access opening of the electrical enclosure. The method also includes attaching a rigid cover, that has a lock-bar opening formed therein, to substantially cover the frame, such that the shackle-hole of the lock-bar passes through the lock-bar opening and is presented within a shroud, having an access port, on the exterior surface of the rigid cover. The method further includes inserting a padlock into the access port of the shroud and engaging the padlock shackle with the shackle hole in the lock-bar, and locking the padlock, thereby securing access to the electrical wiring against theft.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods and components to form various apparatus. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The present invention addresses the problem in the art with teachings directed to a novel access opening cover that is adapted for both new and retrofit installations on a variety of utility poles, utility pole transformer bases, junction boxes, electrical assemblies, and enclosures of other sorts. In the case of a retrofit installation, the originally supplied cover is removed, revealing an access opening. Some openings are cut-outs in the exterior surface of an enclosure, while some are framed and raised away from the surface of the host enclosure. The openings may, or may not, be flanged. The present invention addresses all types. A rigid security cover, which may be fabricated from thick steel plate or other strong material, replaced the original cover. The rigid security cover is configured with strong alignment flanges that extend into the interior or about the exterior of the host opening and engage the host opening so as to maintain a strong alignment therewith. A lock-bar extends from the interior of the enclosure through a lock-bark opening in the rigid security cover. The lock-bar has a padlock shackle hole, such that attachment of a padlock holds the rigid security cover in place on the host opening. With this arrangement, a thief will be frustrated from prying or forcing the rigid security cover away from the opening it protects. With respect to the vulnerability of the lock and shackle, which can be defeated with bolt cutters or a hacksaw, the teachings of the present invention offer further protections. A lock shroud is rigidly attached to the exterior of the rigid security cover, such as by welding, riveting, or other suitable means, which prevents access to the padlock using such tools. An access port is provided in the lock shroud, which is sized to provide just enough access to insert the padlock, engage the shackle through the lock-bar shackle hole, and lock, or unlock, the padlock. Several different means and apparatus are contemplated for securing the lock-bar to the interior of the host enclosure. In the case of an electrical junction box, the original cover may be reattached to the exterior side of the security cover using the same or similar fasteners originally provided with the original cover.

Figure 1:
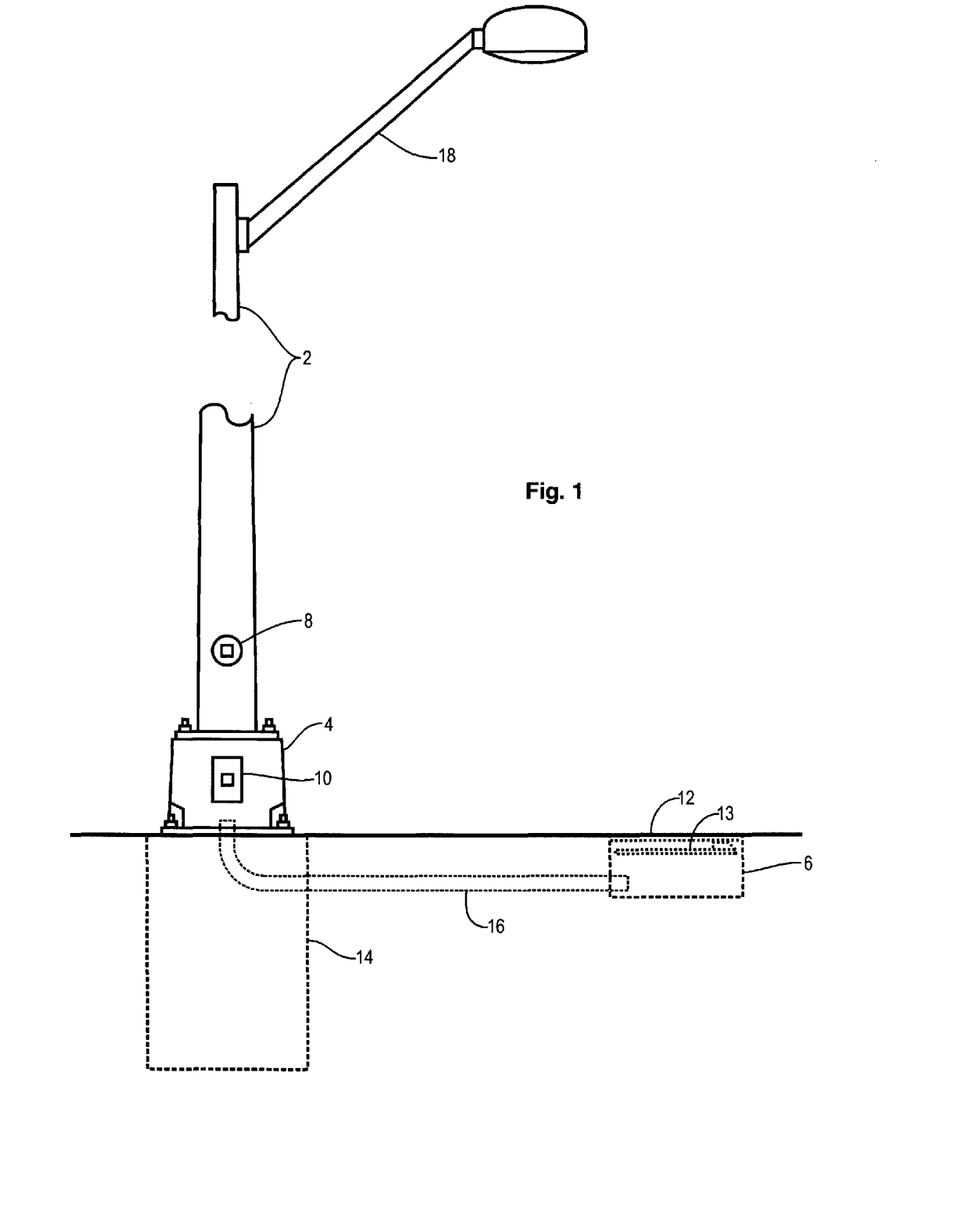
FIG. 1 is a system diagram according to an illustrative embodiment of the present invention.

Reference is directed to FIG. 1, which is a system diagram according to an illustrative embodiment of the present invention. FIG. 1 illustrates a typical utility pole 2 configured as a street light, with a lamp housing and extension arm 18. A transformer base 4 is illustrated, which are commonly used where a high voltage power distribution system is employed, and a step-down transformer is required at the light pole location. The integral light pole is typically mounted on a concrete foundation 14. Conduits 16 or underground cabling is typically employed to route power or other signaling conductors. The power wiring (not shown) is routed through the conduit 16, the transformer base 4 and the utility pole 2. Access to the internal wiring is facilitated with access openings. In the illustrative embodiment of FIG. 1, a round hand-hole with rigid security cover 8 is shown on the utility pole 2, and a rectangular access opening with rigid security cover 10 is illustrated in the transformer base 4. The round hand-hole with security cover 8 and rectangular access opening with security cover 10 are the dominant locations through which a thief would seek access to steal the internal wiring. In addition, a thief may look for other electrical junction points, which is illustrated by example in FIG. 1 as a flush ground junction box 6 in FIG. 1. Although, those skilled in the art will appreciate that a wide variety of junction boxes are known, and would be fully applicable to the teachings of the present invention. FIG. 1 also illustrates a rigid security cover 13 disposed within the ground junction box 6 to secure against access to the electrical wiring in the junction box 6. The original box cover 12 is reattached to the security cover 13, thereby providing a clean and safe surface at the ground level.

Figure 2:
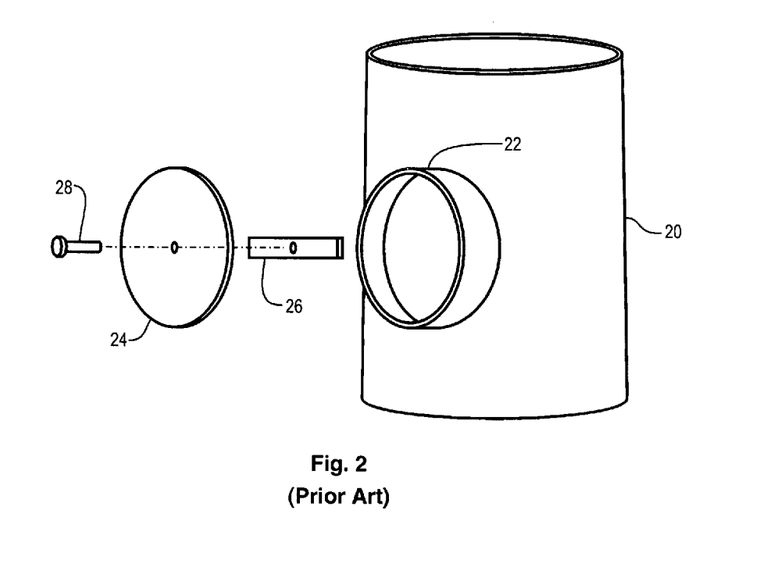
FIG. 2 is a drawing of a prior art access opening and cover.

Reference is directed to FIG. 2, which is a drawing of a prior art access opening and cover. A section of a utility pole 20 is shown in FIG. 2 with a raised hand-hole 22, and a conventional, light gauge, cover 24. The light gauge cover 24 is flat and is held in place with a threaded fastener 28 and a bar 26 with a threaded hole to engage the fastener 28. The problem with this arrangement is that a thief can use a conventional tool to unscrew the fastener 28. It is known in the art to use a fastener with an unconventional engagement means, such as a torque bit, three sided bit, and so forth. However, a clever thief can overcome this approach, which is then rendered an inconvenience, rather than a true security measure. In addition, the cover 24 can be pried off or hammered out of shape be a thief to enable access.

Figure 3:
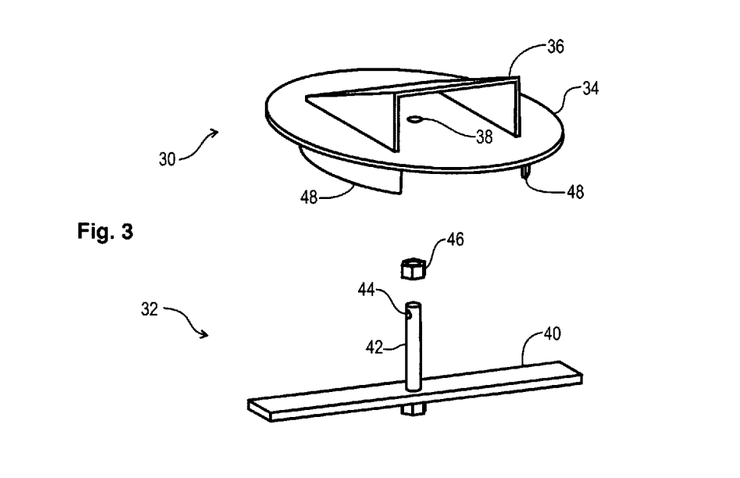
FIG. 3 is a drawing of a security cover apparatus according to an illustrative embodiment of the present invention.

Reference is directed to FIG. 3, which is a drawing of a security cover apparatus according to an illustrative embodiment of the present invention. The security cover of FIG. 3 is suitable for use with the hand-hole of FIG. 2. The security cover of FIG. 3 comprises two parts, an external cover assembly 30 and an internal bar assembly 32. The external assembly consists of a heavy gauge rigid cover 34 that is sized to substantially cover the host access opening. In the illustrative embodiment, steel is used, but other metals or composite materials are suitable. The thickness of the cover is dependent on the size of the host opening and the degree of protection desired. In various embodiments, 10 gauge steel and one-quarter inch steel are employed. One or more alignment flanges 48 extend from the interior side of the cover plate 34. The flanges 48 serve to strengthen the cover plate 34 and engage the host access opening so as to positively locate the cover with respect to the opening. This greatly enhances the security cover's resistance to hammering and prying attacks. The cover plate 34 has a lock-bar hole 38 formed in it, which provides a channel for the lock-bar 42 to extend from the interior side to the exterior side of the cover plate 34. A lock shroud 36 provides protection for a padlock on three sides as well as the exterior side of the padlock and shackle area. A single side of the shroud 36 provides an access port for insertion and operation of the padlock (not shown). The bar assembly consists of a clamp-bar 40 and a lock-bar 42, which are rigidly connected together. In the illustrative embodiment, the lock-bar 42 is a ⅝ inch by three inch long bolt that is welded to the clamp-bar 40. In the drawing of FIG. 3, a nut 46 is used to retain the cover 30 on the lock-bar 42 before the padlock (not shown) is attached to the lock hole 44 in the lock-bar 42. Alternatively, the assembly may be fabricated as a single unit. As just noted above, the lock-bar 42 has a shackle hole 44 formed through it, which is presented on the exterior side of the cover plate 34 when the security cover is assembled as a unit. In the illustrative embodiment, the lock-hole end of the lock bar 42 is machined to a one-quarter inch wide flat section before the lock hole 44 is formed therethrough.

Figure 4:
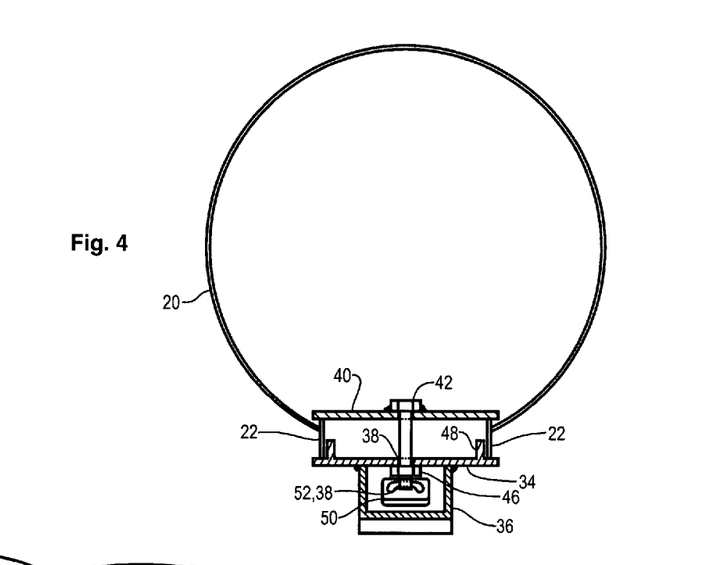
FIG. 4 is a section view drawing of a security cover apparatus installed on a utility pole according to an illustrative embodiment of the present invention.
Figure 5:
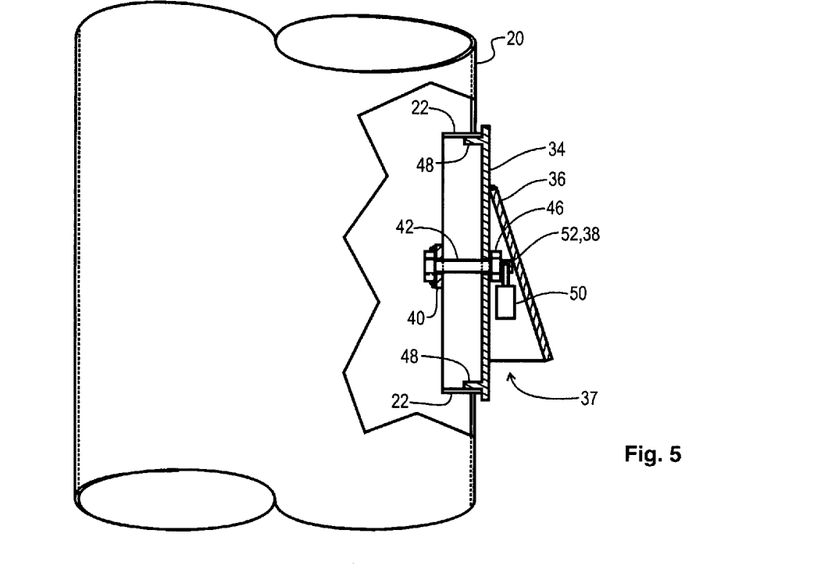
FIG. 5 is a section view drawing of a security cover apparatus installed on a utility pole according to an illustrative embodiment of the present invention.

Reference is directed to FIG. 4 and FIG. 5, which are section view drawings of the security cover apparatus of FIG. 3 installed on the utility pole of FIG. 2, and according to an illustrative embodiment of the present invention. The light pole 20 and hand-hole 22 are illustrated. Note that the hand-hole 22 has sidewalls, which is common in the case where an access opening is provided in a curved surface, such as a round utility pole. The clamp-bar 40 is inserted through the hand-hole 22 with the lock-bar 42 extending to the exterior of the utility pole 20. Note that the clamp-bar 40 and lock-bar 42 are rigidly welded together in this example. The lock-bar 42 extends through the lock-bar opening 38 in the cover plate 34, and presents the shackle opening 52 inside of the lock shroud 36. The retaining nut 46 is threaded onto the end of the lock-bar 42, and is used to urge the cover 34 firmly against the hand-hole frame 22. The padlock 50 is then inserted into the lock shroud 36 through the access port 37, where the padlock 50 shackle 52 is inserted through the shackle hole 38 and locked in place. The cover plate 34 is located with respect to the hand-hole 22 opening with the locating flanges 48 that extend from the interior side of the cover plate 34. This arrangement is highly effective at resisting access to the electrical wiring (not shown) located within the utility pole 20.

Figure 6:
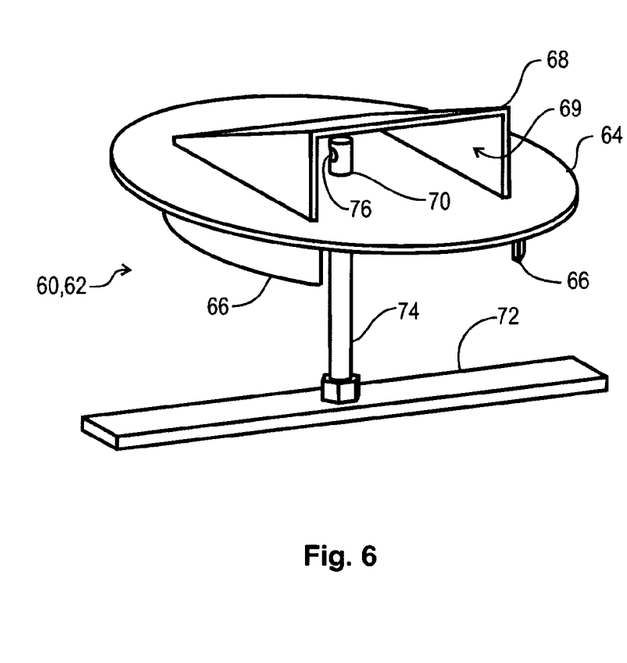
FIG. 6 is a drawing of a security cover apparatus according to an illustrative embodiment of the present invention.
Figure 7:
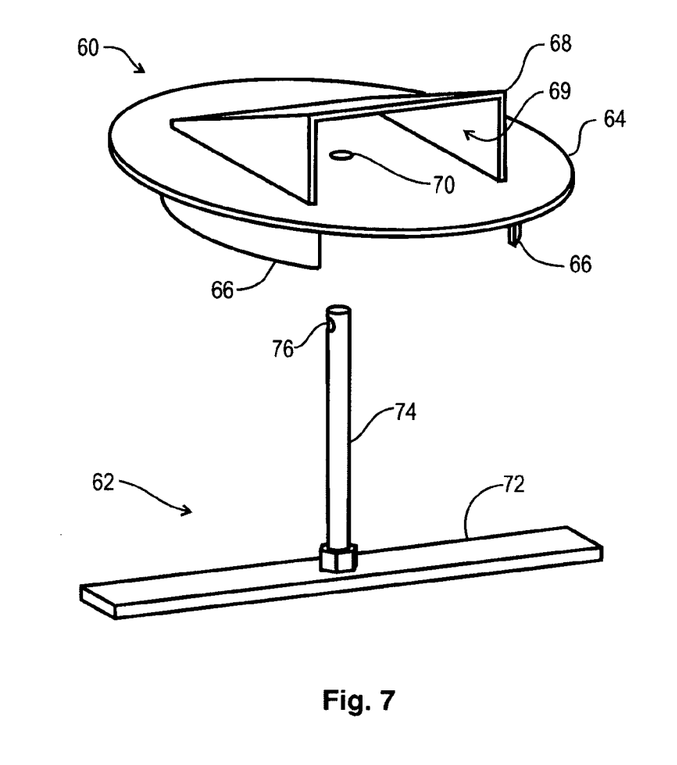
FIG. 7 is a drawing of a security cover apparatus according to an illustrative embodiment of the present invention.

Reference is directed to FIG. 6 and FIG. 7, which are drawings of a security cover apparatus according to an illustrative embodiment of the present invention. These figures illustrate the spatial arrangement of the cover assembly 60 and the back assembly 62. The cover assembly consists of the heavy gauge rigid cover plate 64, which has the alignment flanges 66 extending from the interior side of the cover plate 64. In the illustrative embodiment, a round cover plate is illustrated. Those skilled in the art will appreciate that specific shape of the cover is determined by the shape of the host opening that the cover is designed to protect. For example, round, oval, elliptical, and other accurate shapes are known to be used in access openings. The lock shroud 68 is welded to the exterior side of the cover plate 64. Note that in the illustrative embodiment, the lock shroud 68 is a triangular wedge fabricated from heavy gauge steel, and with an access port opening 69 on its lower side. Those skilled in the art will appreciated that other geometric shapes can readily be employed as the lock shroud. The essential aspects of the shroud are to provide limited access to the shackle area of the lock, while providing just enough access to insert and lock the padlock. The back assembly 62 consists of a clamp-bar 72, which has a length sufficient to engage an internal surface of the host enclosure or utility pole. A lock-bar 74 is rigidly connected to the clamp-bar 72 in the illustrative embodiment. A steel rod is used as the lock-bar 74 in the illustrative embodiment. A shackle hole 76 is formed through the lock-bar 74 to facilitate connection of the padlock shackle. Note that the length of the lock-bar 74 is selected to position the shackle opening 76 between the exterior surface of the cover plate 64 and within the lock shroud 68 while the cover assembly is engaged through the lock-bar hole 70 with the host enclosure or utility pole.

Figure 8:
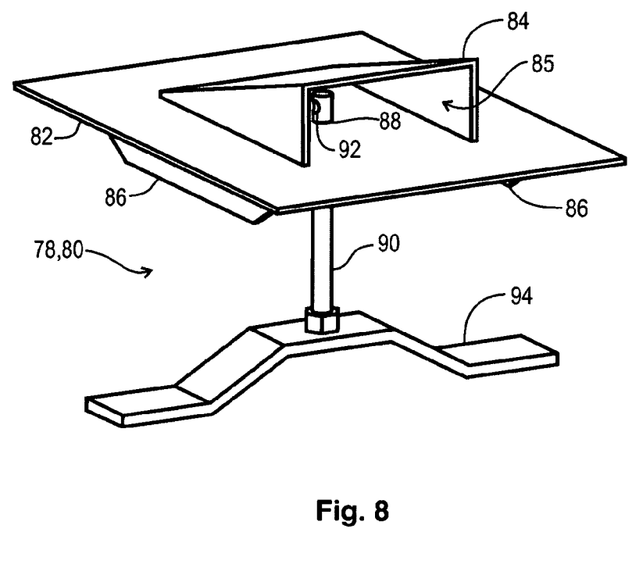
FIG. 8 is a drawing of a security cover apparatus according to an illustrative embodiment of the present invention.
Figure 9:
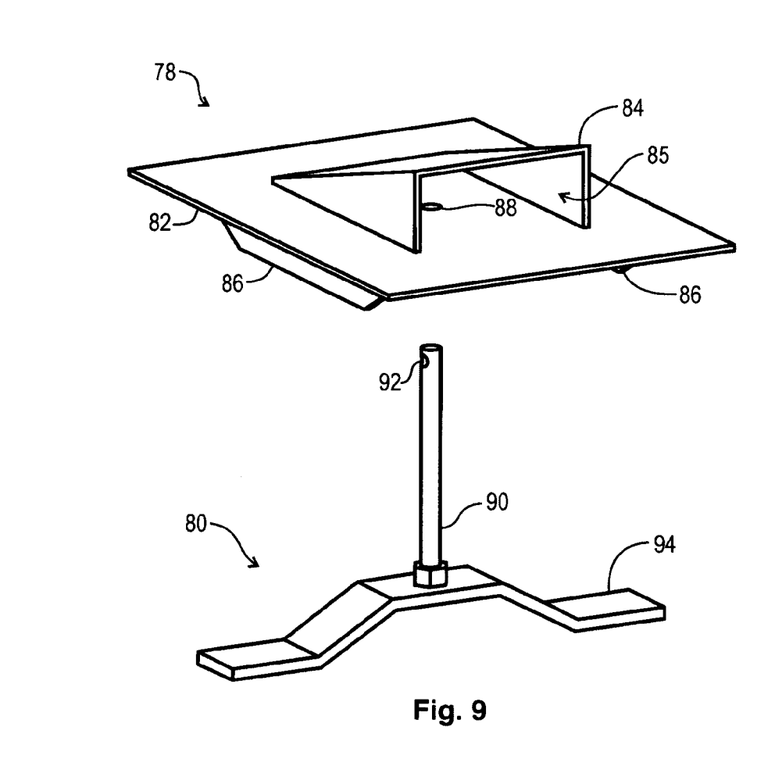
FIG. 9 is a drawing of a security cover apparatus according to an illustrative embodiment of the present invention.

Reference is directed to FIG. 8 and FIG. 9, which are drawings of a security cover apparatus according to an illustrative embodiment of the present invention. These figures illustrate the spatial arrangement of the cover assembly 78 and the back assembly 80. The cover assembly 78 consists of the heavy gauge rigid cover plate 82, which has the alignment flanges 86 extending from the interior side of the cover plate 82. In the illustrative embodiment, a square cover plate is illustrated. Those skilled in the art will appreciate that specific shape of the cover is determined by the shape of the host opening that the cover is intended to protect. For example, square, rectangular, elongated, and other shapes are known to be used in access openings. The lock shroud 84 is welded to the exterior side of the cover plate 82. Note that in the illustrative embodiment, the lock shroud 84 is a triangular wedge fabricated from heavy gauge steel, and with an access port opening 85 on the lower side. Those skilled in the art will appreciated that other geometric shapes can readily be employed as the lock shroud. The essential aspects of the shroud are to provide limited access to the shackle area of the lock, while providing just enough access to insert and lock the padlock. The bar assembly 80 consists of a clamp-bar 94, which has a length sufficient to engage an internal surface of the host enclosure or utility pole. Note that the clamp-bar 94 may be inwardly or outwardly offset so as to conform to the internal configuration of the host enclosure or utility pole. A lock-bar 90 is rigidly connected to the clamp-bar 94 in the illustrative embodiment. A steel rod is used as the lock-bar 90 in the illustrative embodiment. A shackle hole 92 is formed through the lock-bar 90 to facilitate connection of the padlock shackle. Note that the length of the lock-bar 90 is selected to position the shackle opening 92 between the exterior surface of the cover plate 64 and within the lock shroud 68 while the cover assembly is engaged through the lock-bar hole 88 with the host enclosure or utility pole.

Figures 10, 11:
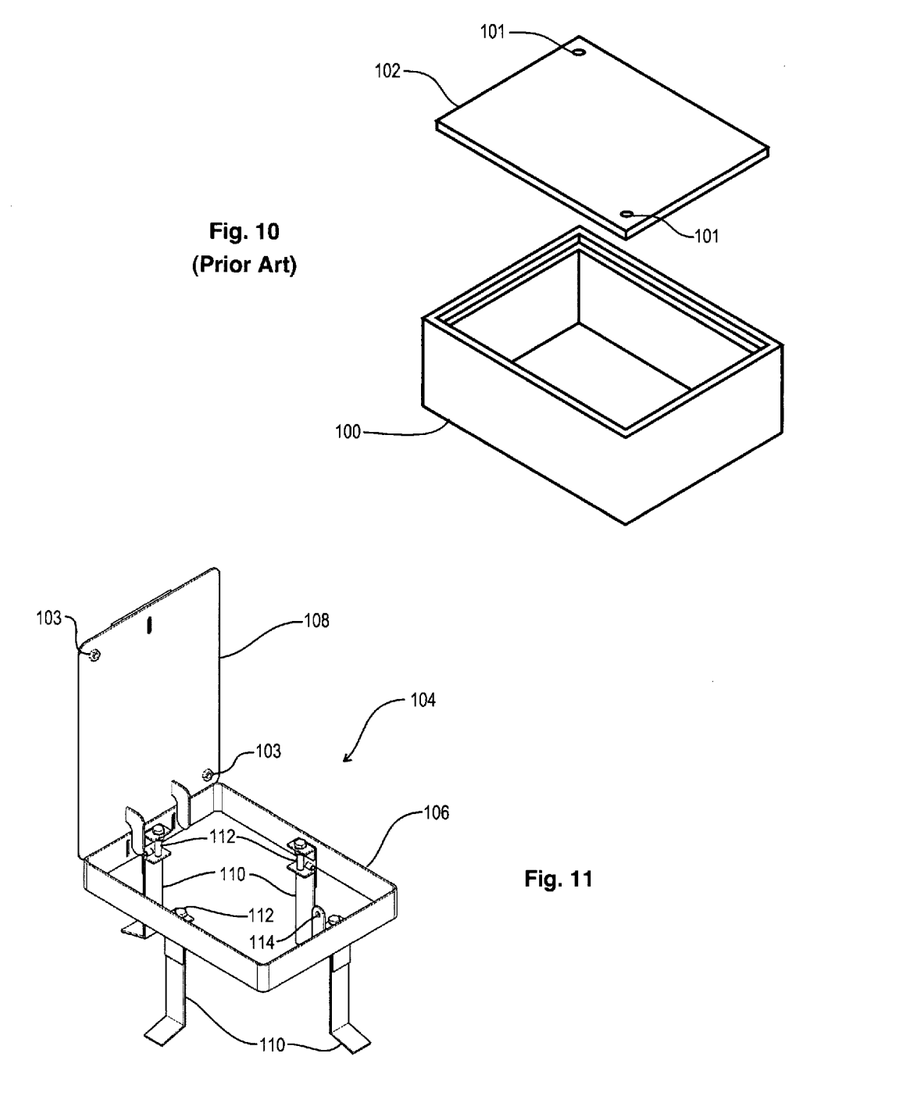
FIG. 10 is a drawing of a prior art electrical junction box.
FIG. 11 is a drawing of a security cover apparatus according to an illustrative embodiment of the present invention.

Reference is directed to FIG. 10, which is a drawing of a prior art electrical junction box. The junction box 100 of FIG. 10 is typical for an in-ground, grade level electrical junction box used in conjunction with utility pole installations. Typically, there will be plural utility poles with subterranean conduits routed through plural ground-level junction boxes, which facilitate installation, service, and routing of power distribution and signaling wiring. The prior art covers 102 are typically secured with conventional fasteners (not shown) using cover holes 101 that engage an internal fastening means (not shown) in the junction box 100, such as threaded holes of threaded brackets. A thief can readily remove the conventional fasteners using conventional tools, thereby exposing the internal wiring to theft.

Reference is directed to FIG. 11, which is a drawing of a security cover apparatus 104 according to an illustrative embodiment of the present invention. The security cover 104 of FIG. 11 is generally adapted to accommodate the ground junction box 100 of FIG. 10. The cover assembly 104 of FIG. 11 consists of a rigid steel frame 106 that is configured to fit the opening of the host junction box. Plural engaging arms 110 extend into the junction box and act as engaging members to hold the frame 106 in place within the opening of the host junction box. Each engaging arm has a corresponding urging means 112, which is a threaded bolt in the illustrative embodiment. During installation, the threaded bolts 112 are tightened to force the engaging arms against the internal surfaces of the host junction box or to reach to the bottom edge of the box in the case of an open bottom ground level junction box, thereby retaining the frame 106 within the junction box opening. A lock-bar 114 with a shackle hole extends upwardly from the exterior side of the frame 106. The rigid steel cover 108 is placed over the frame, and is secured in place by the lock-bar, which is more fully described hereinafter. Plural fastening means 103, such as nuts welding to the cover 108, are aligned to engage the originally supplied cover's fasteners. This arrangement allows the original cover 102 to be positioned over the security cover 108, thereby concealing it and presenting a smooth and safe ground surface.

Figure 12:
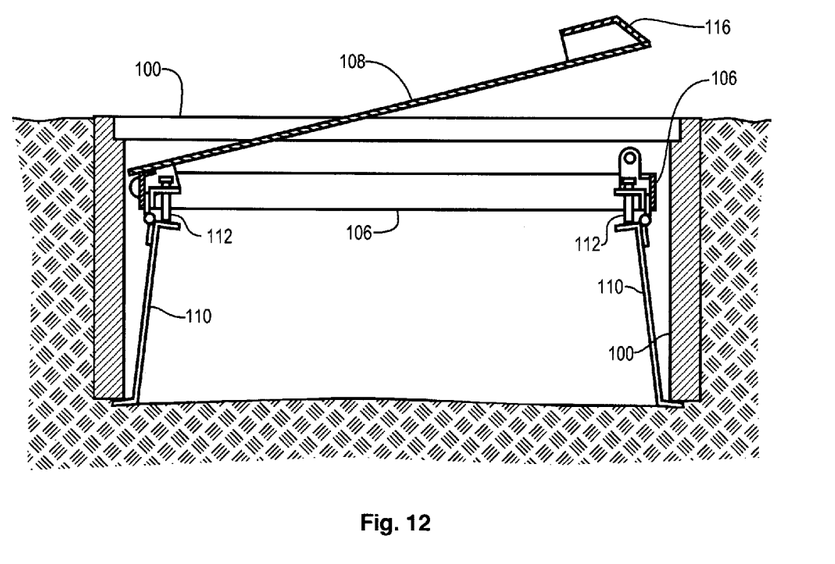
FIG. 12 is a section view drawing of a security cover apparatus installed on an electrical junction box according to an illustrative embodiment of the present invention.
Figure 13:
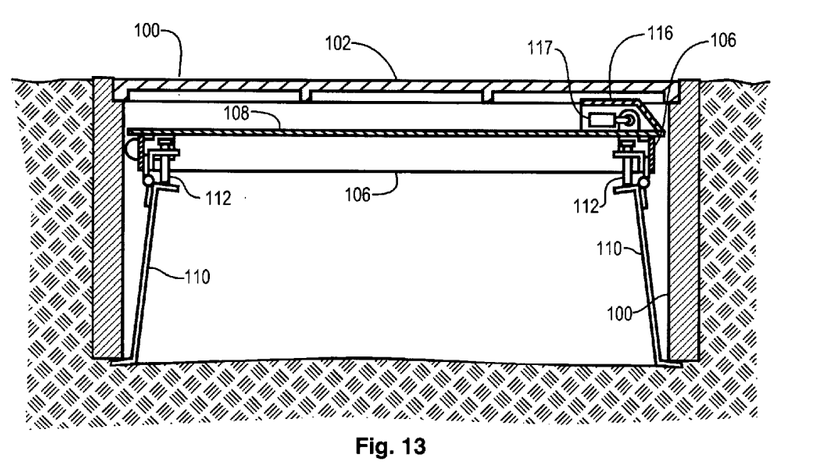
FIG. 13 is a section view drawing of a security cover apparatus installed on an electrical junction box according to an illustrative embodiment of the present invention.

Reference is directed to FIG. 12 and FIG. 13, which are a section view drawings of a security cover apparatus installed on a ground level electrical junction box after subterranean installation 100 according to the illustrative embodiment of the present invention. FIG. 12 illustrated the security cover 108 partially open with the original cover removed, and FIG. 13 illustrates the security cover fully closed with the original cover 102 in place. Note that the junction box 100 has an open bottom, which is typical in such boxes, and that there is a flanged opening on the top, which provides support for the originally supplied cover 102. The frame 106 of the cover assembly is shaped to rest within the opening flange of the host enclosure 100. The size and shape of the illustrative embodiment frame 106 and cover 108 are dependant upon the size and shape of the host junction box 100. In the illustrative embodiment, it is rectangular. Plural engaging arms 110 are flexibly coupled to the frame 106 with hinges in the illustrative embodiment. Plural corresponding threaded bolts 112 are rotated to force downwardly upon the upper flange of the engaging arms 110, which causes each arm to rotate about its hinge. This rotation urges the lower portion of each arm outwardly until the lower flange of each engaging member 110 is forced against the interior surface of the junction box 100. The length and shape of the engaging arms is designed to conform to the junction box. In the illustrative embodiment, the arms 110 are long enough to rest on the soil at the bottom of the enclosure, and are urged into the earth at the bottom edge of the junction box 100 side walls. Having secured the frame 106 on the junction box 100, the cover 108 can be placed into position and secured.

The cover 108 in FIG. 12 and FIG. 13 is secured to the frame 106 using one or more lock-bars 114 which extend upwardly to the exterior of the frame 106. A lock-bar hole (not shown) in the cover 108 engages the lock-bar 114 within a lock shroud 116 on the exterior of the cover 108. The lock shroud 116 protects a padlock while providing just enough access to insert and lock the padlock in place, as was described hereinbefore. In the illustrative embodiment, a single lock-bar 114 is used in combination with plural cover tangs (discussed hereinafter) to hold the cover 108 in position on the frame 106. It will be appreciated that the cover could also be secured with plural lock-bars and plural lock shrouds using plural padlocks, with the cover tangs being omitted entirely.

Figures 14, 15:
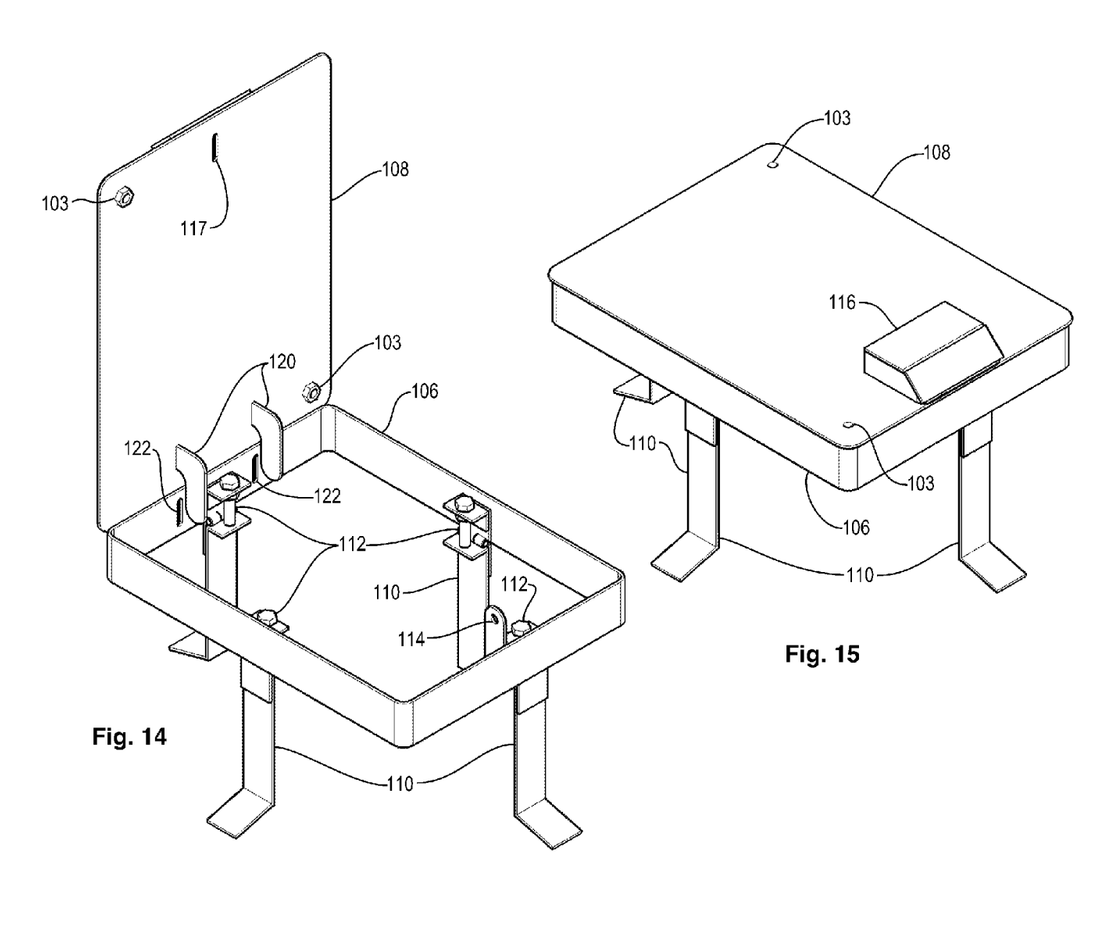
FIG. 14 is a drawing of a security cover apparatus according to an illustrative embodiment of the present invention.
FIG. 15 is a drawing of a security cover apparatus according to an illustrative embodiment of the present invention.

Reference is directed to FIG. 14 and FIG. 15, which are drawings of the security cover apparatus according to an illustrative embodiment of the present invention. FIG. 14 illustrates the cover 108 fully open and FIG. 15 illustrated the cover fully closed. The frame 106 is formed to accommodate the shape of the host enclosure opening. Four engaging arms 110 extend downwardly from the interior side of the frame 106, and each has a lower flange extending outwardly to engage the interior of the host junction box. Each engaging arm is attached by a hinge and threaded bolt assembly 112. When the bolts are tightened, they force downwardly in the upper flange of the engaging arms, which rotates the arms about the hinge assemblies 112. Once the frame is securely attached to the host junction box or enclosure, the cover 108 is secured into position, thereby preventing further access to the bolt and hinge assemblies 112. The cover 108 is held in position using a pair of cover tangs 120 that engage corresponding tang slots 122 in the frame 106. The tangs 120 are inserted into the slots 122, and the cover is then rotated downwardly so that the lock-bar slot 117 engages the lock-bar 114. The lock-bar 114 has a shackle hole formed therein, which is presented within the lock shroud 116. The padlock is inserted through an access port (not visible in this perspective) for securely locking the cover 108 in place.

Reference is directed to FIGS. 16A-D, which are section view drawings of a security cover apparatus installed on utility poles according to several illustrative embodiments of the present invention. FIG. 16-A illustrates a utility pole 124 with a shallow depth framed access opening 126. A clamp-bar 134 and lock bar 136 that are formed to accommodate a shallow depth framed opening are inserted through the opening 126. The cover with alignment flanges 128 is inserted into the framed opening 126, with the lock-bar 136 extending into the lock shroud 130, where the padlock 132 is attached to the end of the lock-bar 132.

Figure 16:
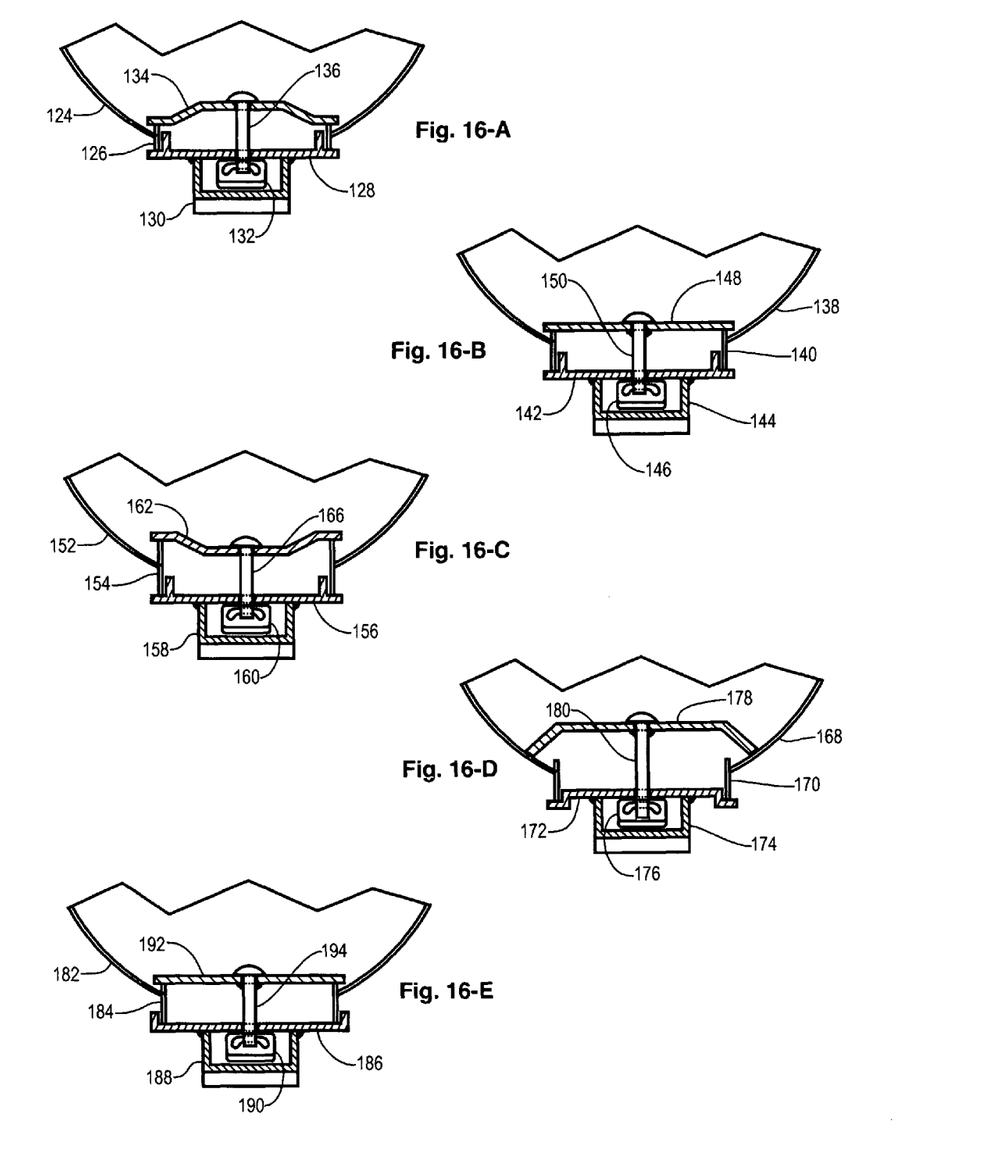
FIGS. 16A-E are section view drawings of a security cover apparatus installed on utility poles according to an illustrative embodiments of the present invention.

FIG. 16-B illustrates a utility pole 138 with a standard depth framed access opening 140. A flat clamp-bar 148 and lock bar 150 that are formed to accommodate a standard depth framed opening are inserted through the opening 140. The cover with alignment flanges 142 is inserted into the framed opening 140, with the lock-bar 150 extending into the lock shroud 144, where the padlock 146 is attached to the end of the lock-bar 150.

FIG. 16-C illustrates a utility pole 152 with a deep depth framed access opening 154. A clamp-bar 162 and lock bar 166 that are formed to accommodate a deep depth framed opening are inserted through the opening 154. The cover with alignment flanges 156 is inserted into the framed opening 154, with the lock-bar 166 extending into the lock shroud 158, where the padlock 160 is attached to the end of the lock-bar 166.

FIG. 16-D illustrates a utility pole 168 with a framed access opening 170. A clamp-bar 178 and lock bar 180 that are formed to engage the interior surface of the utility pole 168 directly, rather than the frame 170, are inserted through the opening 170. The cover having alignment flanges that are stamped into the cover material 156 is inserted into the framed opening 170, with the lock-bar 180 extending into the lock shroud 174, where the padlock 176 is attached to the end of the lock-bar 180.

FIG. 16-E illustrates a utility pole 182 with a framed access opening 184. A clamp-bar 192 and lock bar 194 that are formed to engage the frame 184, and are inserted through the opening 184. The cover 186 having alignment flanges that are formed and sized to engage the exterior of the framed opening 184 is inserted into the framed opening 184, with the lock-bar 194 extending into the lock shroud 188, where the padlock 190 is attached to the end of the lock-bar 194.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A security cover apparatus for an access opening in an enclosure, which is selectively securable using a padlock having a shackle, comprising:

a rigid cover, configured to substantially cover the access opening in the enclosure, having an exterior surface and an interior surface, and having a lock-bar opening formed therethrough;

a shroud fixed about said lock-bar opening on said exterior surface of said rigid cover, said shroud having an access port for enabling insertion of the padlock between said shroud and said exterior surface of said rigid cover;

an alignment flange extending from said interior surface of said rigid cover for engaging the access opening and aligning said rigid cover therewith;

a clamp-bar having a dimension sufficient to engage an interior surface of the enclosure;

a lock-bar connected to said clamp-bar at a first end, and having a shackle hole formed in a second end, said lock-bar extendable through said lock-bar opening in said rigid cover while said clamp-bar is engaged with the interior of the enclosure, and wherein said shackle-hole is accessible through said access port when so engaged.

2. The apparatus of claim 1, and wherein the enclosure is an electrical enclosure, and wherein:
said rigid cover is adapted to prevent a theft of copper wiring disposed within the enclosure.

3. The apparatus of claim 1, and wherein the access opening is a hand-hole having a frame fixed to the enclosure, and wherein:
said clamp-bar engages the hand-hole frame in the interior of the enclosure.

4. The apparatus of claim 1, and wherein:
said shroud comprises three sides and an exterior front surface, and said access port is formed by omitting a fourth side of said shroud.

5. The apparatus of claim 1, and wherein:
said cover, said alignment flange, and said shroud are welded to form an integral unit.

6. The apparatus of claim 1, and wherein:
said clamp-bar and said lock-bar are welded to form an integral unit.

7. The apparatus of claim 1, and wherein said lock-bar is threaded along said second end, and further comprising:
a retaining nut for threadably engaging said second end of said lock-bar and disposition between the exterior surface of said rigid cover and said shackle hole.

8. A security cover apparatus for an access opening in an enclosure, which is selectively securable using a padlock having a shackle, comprising:
a frame defining an opening generally conformed to a shape of an access opening in the enclosure, and having a lock-bar fixed thereto and extending beyond an exterior side thereof, said lock-bar having a shackle-hole formed therein;
a rigid cover having an exterior surface and an interior surface, and configured to substantially cover said opening in said frame, and having a lock-bar opening formed therethrough, and wherein said lock-bar extends through said lock-bar opening while said rigid cover is engaged with said frame, thereby enabling the retention of said rigid cover on the exterior side of said frame by engaging the padlock shackle through said shackle hole;
a lock shroud fixed to said exterior surface of said rigid cover about said lock-bar opening, said lock shroud having an access port for insertion of the padlock;
plural engaging members flexibly coupled to said frame and extending beyond said interior side thereof, said engaging members adapted to extend into an interior of the enclosure when said frame is aligned to the access opening of the enclosure;
plural urging means correspondingly disposed between said frame and said plural engaging members, and adapted to urge said plural engaging members against the interior surface of the enclosure, thereby fixedly retaining said frame to the access opening of the enclosure.

9. The apparatus of claim 8, and wherein the enclosure is a ground-installed electrical enclosure, and wherein:
said rigid cover is adapted to prevent a theft of copper wiring disposed within the enclosure.

10. The apparatus of claim 8, and wherein:
said frame further includes at least a first opening formed therein, and wherein
said cover further comprises at least a first cover tang extending from said exterior side thereof for engaging said first opening in said frame, thereby retaining said cover to said frame.

11. The apparatus of claim 8, and wherein:
said lock shroud comprises three sides and an exterior front surface, and said access port is formed by omitting a fourth side of said shroud.

12. The apparatus of claim 8, further comprising:
plural hinges disposed between said frame and said plural engaging members to flexibly couple such corresponding said engaging members to said frame.

13. The apparatus of claim 8, and wherein:
said plural urging means are threaded fasteners disposed to rotate said plural engaging means outwardly, thereby engaging the interior of the enclosure and retaining said frame about the access opening.

14. The apparatus of claim 8, and wherein the enclosure includes an exterior cover, and wherein:
said rigid cover further includes at least a first fastening means disposed thereon for access from the exterior surface thereof, for engaging at least a first fastener for retaining the exterior cover about said exterior surface of said rigid cover.

15. A method of selectively securing, against theft, the electrical wiring in a utility pole having a hand-hole designed for use with a conventional hand-hole cover, comprising the steps of:
inserting a clamp-bar and lock-bar unit into the hand-hole and aligning the clamp-bar portion to engage an interior surface of the utility pole such that an end of the lock-bar having a shackle hole formed therein is exposed on the exterior of the hand-hole;
substantially covering the hand-hole with a rigid cover, and aligning at least a first flange extending from an interior surface of the rigid cover with the hand-hole;
engaging a lock-bar opening formed in the rigid cover about the lock-bar such that the shackle-hole of the lock-bar is presented within a shroud, having an excess port, on an exterior surface of the rigid cover;
inserting a padlock into the access port of the shroud and engaging the padlock shackle with the shackle hole in the lock-bar, and
locking the padlock, thereby securing access to the electrical wiring against theft.

16. A method of selectively securing, against theft, electrical wiring in an electrical enclosure having an access opening designed for use with a conventional access opening cover, comprising the steps of:
aligning a frame to the access opening in the electrical enclosure, the frame having a lock-bar with a shackle hole extending from its exterior side and plural engaging members flexibly coupled thereto and extending beyond an interior side thereof;
operating plural urging means correspondingly disposed between the frame and the plural engaging members, thereby urging the plural engaging members against an interior surface of the enclosure, thereby fixedly retaining the frame to the access opening of the electrical enclosure;
attaching a rigid cover, having a lock-bar opening formed therein, to substantially cover the frame, such that the shackle-hole of the lock-bar passes through the lock-bar opening and is presented within a shroud, having an access port, on an exterior surface of the rigid cover;
inserting padlock into the access port of the shroud and engaging the padlock shackle with the shackle hole in the lock-bar, and
locking the padlock, thereby securing access to the electrical wiring against theft.

* * * * *